Figure 1:
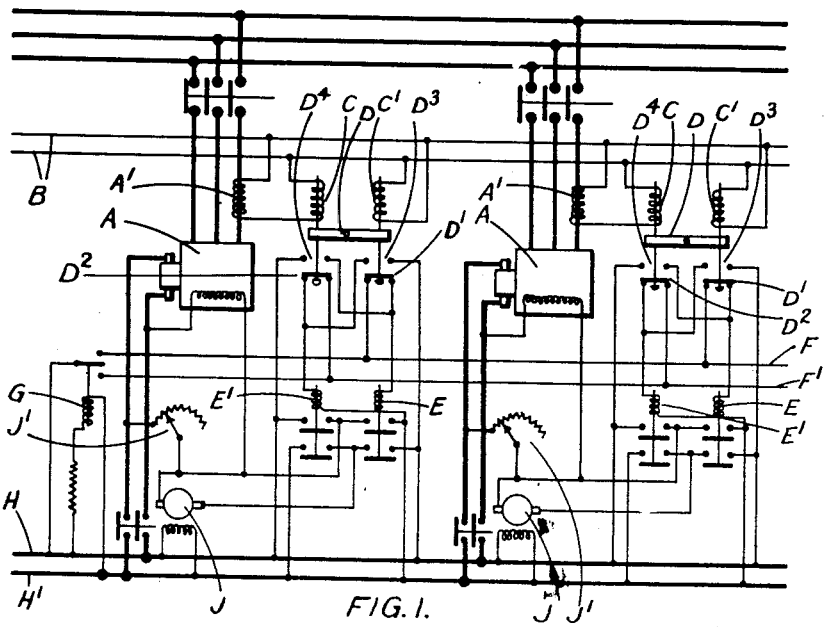

May 28, 1929.  W. A. A. BURGESS ET AL  1,714,656
ELECTRICAL LOAD SHARING APPARATUS
Filed May 3, 1928    2 Sheets-Sheet 1

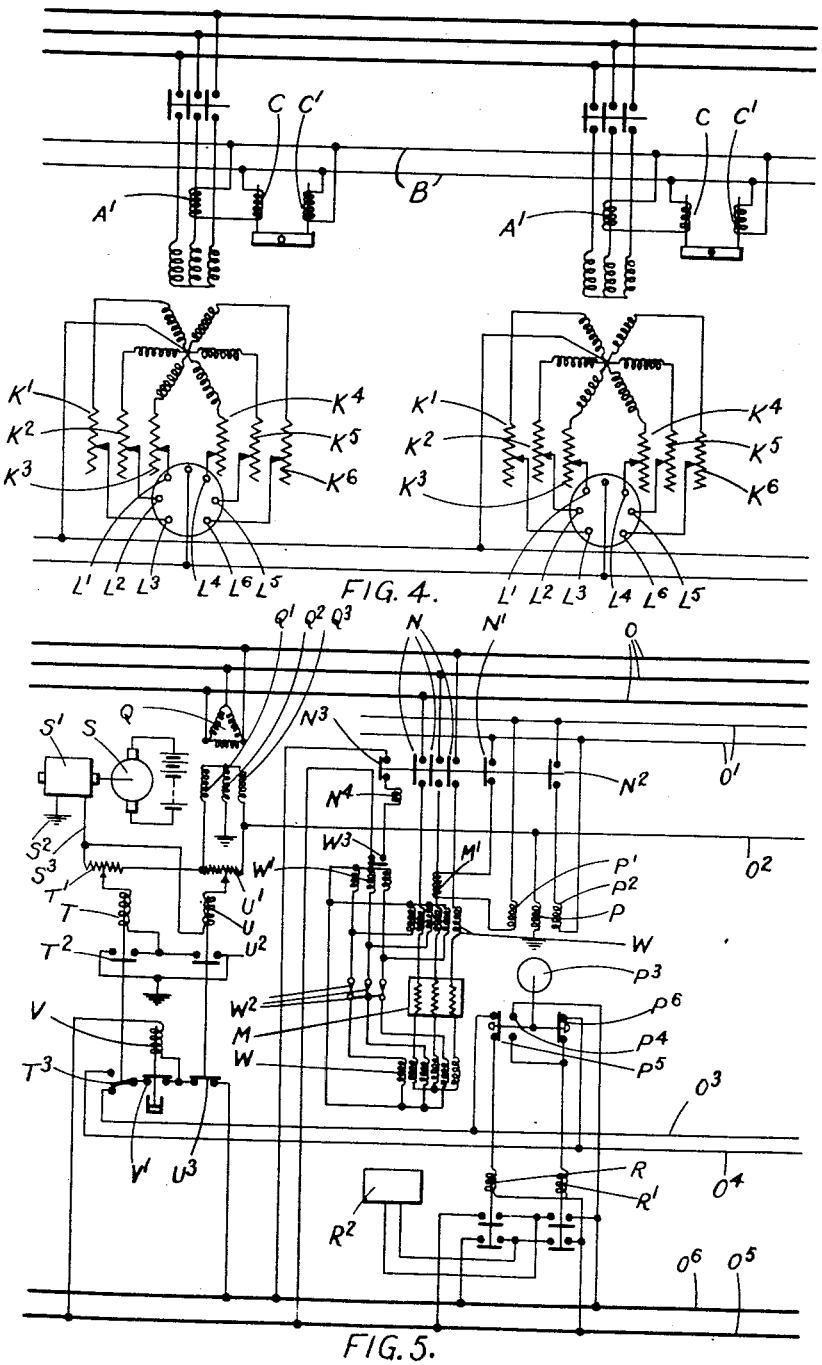

Patented May 28, 1929.

1,714,656

UNITED STATES PATENT OFFICE.

WILLIAM ANTHONY AMBROSE BURGESS, OF MONKSEATON, AND NORMAN COOKE, OF SUNDERLAND, ENGLAND, ASSIGNORS TO A. REYROLLE & COMPANY LIMITED, OF HEBBURN-ON-TYNE, ENGLAND, A COMPANY OF GREAT BRITAIN.

ELECTRICAL LOAD-SHARING APPARATUS.

Application filed May 3, 1928, Serial No. 274,890, and in Great Britain June 10, 1927.

This invention relates to apparatus for automatically sharing the load between a number of electrical generating or translating devices in accordance with predetermined requirements.

It has been proposed in the case of rotary converters working in parallel to provide each machine with a separate exciter and to connect the fields of the machines in series with one another. If the machines are identical with one another, this arrangement ensures a satisfactory sharing of the load, but unless complicated switching arrangements are employed, the sequence of starting-up and shutting-down of the machines is fixed so that the first machine will be subjected to greater wear than the others with the result of impairing the efficiency of the load-sharing arrangements.

In another known arrangement the field currents of two rotary converters are normally balanced against one another in a differential relay which acts to restore the normal balance between the field currents when it is disturbed for any reason. This arrangement, although efficient in the case of two machines, cannot be easily applied to a larger number of machines.

In the load-sharing apparatus for a number of electrical generating or translating devices according to the present invention, a relay associated with each device is energized differentially in accordance with the load on the associated device and with the average load on all the devices, and means are provided whereby each relay acts to control the regulation of the voltage or output of its associated device. Such regulation is preferably controlled partly by the associated differential relay and partly by a controller common to all the devices. The common controller is preferably so actuated as to make one set of contacts when the total load on all the devices falls below a predetermined value and another set of contacts when the total load exceeds a predetermined value. Changes in voltage or, in the case of A. C. devices, changes in frequency may be employed as a measure of the change in total load or output for the actuation of the common controller.

The terms "average load" and "total load" as herein used may be defined respectively as the mean value of the individual loads on the working devices and as the sum of the individual loads on the working devices, so that the total load is equal to the product of the average load and the number of working devices.

Each differential relay in the case of generating or converting machines is preferably provided with contacts (which may be referred to as "permissive" contacts) acting when closed to permit the common controller to perform the desired regulation. Each relay may also be provided with further contacts ("positive" contacts) to enable the relay to control the voltage or output of its associated machine independently of the common controller.

The arrangement of the differential relays and the manner in which they are energized may vary. Thus in the case of A. C. devices one side of each relay may be energized from a current transformer connected to the associated device, whilst the other side is energized from summation busbars connected to all the current transformers. In another arrangement a single current transformer suitably connected to the circuit is employed for energizing the average sides of the differential relays. In the case of D. C. devices each relay may be energized differentially from a shunt connected to the associated device and from a shunt in the main D. C. circuit to which the devices are connected. In some instances and more especially in the case of A. C. generators, it is preferred to employ differential relays of the wattmeter type.

Figure 2:
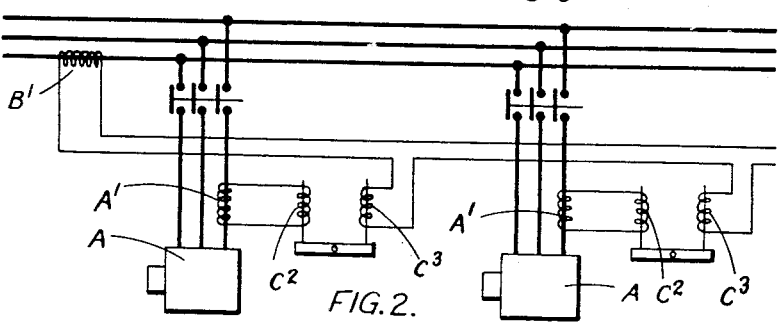
Figure 3:
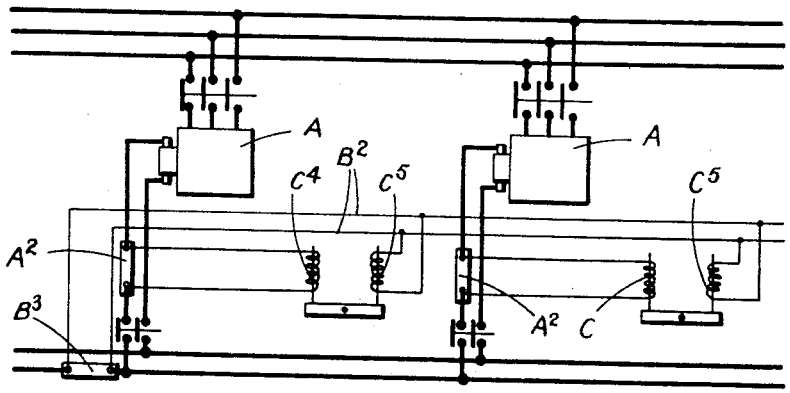

The invention may be carried out in various ways, but some preferred arrangements according thereto are illustrated by way of example in the accompanying drawings, in which Figure 1 shows one arrangement as applied to the control of a number of rotary converters operating in parallel, Figures 2 and 3 show modifications of the arrangement of Figure 1, Figure 4 illustrates the application of the arrangement of Figure 1 to mercury arc rectifiers, and Figure 5 shows an alternative arrangement applied to the control of A. C. generators.

In the arrangement of Figure 1 each rotary converter A is provided on its A. C. side with a current transformer, whose secondary $A^1$ is connected across a pair of summation busbars B common to all the machines, these busbars thus being energized in accordance with the total load on all the machines.

Each machine has associated with it a differential relay provided with two coils C C$^1$, which will be referred to respectively as the "machine" coil and the "average" coil. The machine coil C of each relay is connected in series with the secondary A$^1$ of the corresponding current transformer, whilst the average coil C$^1$ is connected across the summation busbars B. Thus the individual machine load will be balanced against the average load on all the machines, and if one side preponderates the contact beam D, on which the two coils C C$^1$ of the relay act, will move one way or the other and will operate the relay contacts.

Each relay is provided with four sets of contacts, two of which D$^1$ D$^2$ (the permissive contacts) are normally closed, whilst the other two D$^3$ D$^4$ (the positive contacts) are normally open. The permissive contacts D$^1$ D$^2$ are so arranged that movement of the beam D in one direction or the other will open one set but leave the other closed. The two sets of permissive contacts D$^1$ D$^2$ are connected on one side respectively to a lower volts contactor E and to a raise volts contactor E$^1$, and on the other side respectively to a lower volts busbar F and to a raise volts busbar F$^1$. These two busbars F F$^1$ are alternatively connected to the positive side H of a D. C. source of controlling current H H$^1$, such connection being controlled by a voltage regulator G common to all the machines. This voltage regulator G may be of any suitable type but is preferably of the balanced beam relay type, the arrangement being such that when the voltage is low the raise volts busbar F$^1$ is connected to the D. C. source H and when the voltage is high the lower volts busbar F is connected to the D. C. source, whilst for normal voltage neither busbar is energized. Thus the change in voltage is employed as a measure of change in the total output of the machines. The negative side H$^1$ of the D. C. source is connected to the raise and lower volts contactors of all the machines. Thus when the load conditions are such as to require the voltage to be raised, the voltage regulator G will move over and energize the raise volts busbar F$^1$. This will have the effect of energizing the raise volts contactors E$^1$ on those machines which are carrying average or less than average load at the time. Similarly when it is required to lower the voltage, the lower volts contactors E will be energized on those machines which are carrying average or more than average load. The two contactors E E$^1$ control the supply of current to the armature of a separately excited motor J which operates the machine field rheostat J$^1$, the arrangement being such that the direction of rotation of the motor J depends upon which of the two contactors E E$^1$ is energized.

The two positive sets of contacts D$^3$ D$^4$ on the relay are normally open and are so arranged that one or the other is closed when the relay beam D moves more than a predetermined distance. These two sets of contacts serve to make a direct connection (independent of the voltage regulator G) from the positive side H of the D. C. source respectively to the two contactors E$^1$ E. Thus when a machine is carrying much less than its share of the load (as for example is often the case when the machine is first synchronized) the beam of the associated relay will move far enough not only to open one set of permissive contacts D$^1$ but also to close one set of positive contacts D$^3$, thereby energizing the raise volts contactor E$^1$ on the individual machine. A similar lower volts operation will be effected by the positive contacts D$^4$ in the case when the associated machine happens to be carrying much more than its share of the load.

The above arrangement may be modified in various ways. Thus for example instead of energizing the average coils of the differential relays from summation busbars, these coils may be energized in parallel or in series from the secondary of a single current transformer suitably connected in the main A. C. circuit of the machines, the machine coils being as before energized from current transformers connected to the individual machines. Again if it is desired to energize the relay coils from the D. C. side, the current transformers may be replaced by shunts, the average coils being energized in parallel from a shunt in the main D. C. circuit. Two such arrangements are illustrated in Figures 2 and 3.

In the arrangement of Figure 2 the machine coil C$^2$ of each differential relay is directly energized from the corresponding current transformer secondary A$^1$, whilst the average coils C$^3$ of all the relays are connected in series with one another and are energized from the secondary B$^1$ of a current transformer in the main A. C. circuit. In other respects the arrangement is identical with that of Figure 1.

Figure 3 illustrates by way of example one arrangement in which the relays are energized from the D. C. sides of the machines. Each machine coil C$^4$ in this arrangement is directly connected across a shunt A$^2$ on the D. C. side of the associated machine A, whilst the average coils C$^5$ are connected in parallel with one another to busbars B$^2$ energized from a shunt B$^3$ in the main D. C. circuit H H$^1$.

The foregoing arrangements may be employed without modification for motor converters or for rectifiers of the mercury arc or other types and also (when shunts are employed for energizing the relay coils) for D. C. generators.

Figure 4 illustrates by way of example the application of the arrangement of Figure 1 to mercury arc rectifiers. In this arrangement the two coils C $C^1$ of each relay are energized as in Figure 1 respectively from the secondary $A^1$ of a current transformer on the A. C. side of the associated rectifier and from summation busbars B. The relay contacts $D^1$ $D^2$ $D^3$ $D^4$, the voltage regulator G, the two contactors E $E^1$ and the motor J are omitted from Figure 4, but it will be understood that they are arranged in exactly the same manner as in Figure 1. The motor J, however, instead of driving a field rheostat arm $J^1$, in this instance acts to vary reactances $K^1$ $K^2$ ... $K^6$ connected in series with the rectifier anodes $L^1$ $L^2$ ... $L^6$.

For A. C. devices, such as generators or transformers, a similar arrangement could be employed, the common voltage regulator G (Figure 1) being replaced by a frequency operated contact-making device so arranged as to make one set of contacts when the frequency is high and another set when the frequency is low. It will generally be unnecessary, however, in the case of transformers to provide the differential relays with permissive contacts, since the frequency of the system will not, in general, vary with the load on the transformers.

A preferred arrangement for use with A. C. generators is illustrated by way of example in Figure 5. In this arrangement a number of three-phase generators M (one only being shown in the drawing) are connected in parallel through circuit-breakers N to the A. C. load circuit O. Each generator is provided with a single-phase current transformer, whose secondary $M^1$ is connected through an auxiliary switch $N^1$ on the circuit-breaker N across summation busbars $O^1$ common to all the generators, the busbars $O^1$ thus being energized in accordance with the average load on all the generators.

In this instance the differential relay associated with each generator is of the wattmeter type, so that its operation will be a true indication of the actual load on the machine, and comprises two current coils $P^1$ $P^2$ (respectively constituting a machine coil $P^1$ in series with the current transformer secondary $M^1$ and an average coil $P^2$ connected across the summation busbars $O^1$ through an auxiliary switch $N^2$ on the circuit-breaker N) and a voltage coil P connected between a busbar $O^2$ and earth, this busbar $O^2$ being connected to the lagging phase $Q^3$ of a potential transformer secondary $Q^1$ $Q^2$ $Q^3$ having one phase $Q^2$ earthed. This potential transformer is common to all the machines and has its primary Q connected across the load circuit O. These coils P $P^1$ $P^2$ act differentially on the wattmeter disc $P^3$ which control contacts similar to those operated by the beams of the differential relays in the previously described arrangements. If the generators are driven by turbines and are synchronized at a throttle opening which will not provide much power, the machine will take much less than its share of the load when first synchronized, and it will thus only be necessary to provide positive contacts $P^4$ on one side of each relay, two sets of permissive contacts $P^5$ $P^6$ being provided as before. The permissive contacts $P^5$ control the circuit from a lower-speed busbar $O^3$ to a lower-speed contactor R, whilst the contacts $P^6$ similarly control the circuit from a raise-speed busbar $O^4$ to a raise-speed contactor $R^1$. The two contactors R $R^1$ are each connected to one side $O^5$, say the negative side, of D. C. control busbars $O^5$ $O^6$, and the two speed-control busbars $O^3$ $O^4$ are selectively connected to the positive D. C. busbar $O^6$ under the control of a common frequency regulator shortly to be described, changes in the frequency of the system being employed in this case as a measure of changes in the total output of the generators. The two contactors R $R^1$ control the polarity of the energizing current from the D. C. busbars $O^5$ $O^6$ to an auxiliary motor $R^2$ which acts to raise or lower the speed of the generator M in accordance with its direction of rotation in some suitable manner as by controlling the governor of the turbine driving the generator. The positive contacts $P^4$ control a direct energizing circuit to the raise-speed contactor $R^1$ from the D. C. busbars $O^5$ $O^6$ independently of the speed-controlling busbars $O^3$ $O^4$.

Any suitable form of frequency regulator may be employed but one convenient arrangement (which forms the subject of a separate patent application) is illustrated in Figure 5. In this arrangement the frequency of circuit O is synchronized with that of a source of E. M. F. of standard frequency such as a constant speed motor-generator set comprising a D. C. motor S driving an A. C. generator $S^1$, one side $S^2$ of which is earthed whilst the other $S^3$ is connected to the synchronizing apparatus now to be described.

A resistance $T^1$ having a mid-point tapping is connected on one side to the lead $S^3$ from the A. C. generator $S^1$ and on the other side to the leading phase $Q^1$ of the potential transformer secondary. The mid-point tapping on the resistance $T^1$ is connected to earth through a synchronizing relay T and the normally open contacts $U^2$ of an auxiliary synchronizing relay U, which is connected on one side to the lead $S^3$ from the A. C. generator $S^1$ and on the other side to a mid-point tapping on a resistance $U^1$ connected between the leading and lagging phases $Q^1$ $Q^3$ of the potential transformer secondary. Thus the synchronizing relay T cannot lift its contacts $T^3$ unless the auxiliary synchronizing relay U has already been energized, but when it does so it at once makes its own retaining circuit at contacts $T^2$ so that the fall of the contacts $T^3$ is independent of the fall of the auxiliary synchronizing relay contacts $U^2$. The auxiliary synchronizing relay U has a further set of normally closed contacts $U^3$ controlling the circuit from the D. C. busbars $O^5$ $O^6$ to an interrupter relay V, which has a time-lag associated with its lift but not its fall. The synchronizing relay contacts $T^3$ are arranged as change-over contacts to control the energization of the two speed-controlling busbars $O^3$ $O^4$, the circuit being taken through the auxiliary synchronizing relay contacts $U^3$ and through the normally closed contacts $V^1$ of the interrupter relay.

The operation of the arrangement will now be described. So long as the frequency in the load circuit O remains in agreement with that of the A. C. generator $S^1$, the synchronizing relay contacts $T^3$ will be lifted and the auxiliary synchronizing relay U will be deenergized so that the interrupter relay contacts $V^1$ are in their lifted position. Under these conditions the speed-controlling busbars $O^3$ $O^4$ are deenergized.

If now the load conditions in the circuit O change to a considerable extent, the result will be an uneven distribution of the load among the machines M and a change in the frequency of the system. Some of the wattmeter relays will thus open one or other of their sets of permissive contacts $P^5$ or $P^6$ and the normal condition of the synchronizing relays will be changed. The manner of operation of the synchronizing relays can best be described with reference to the rotation of the needle of a rotary synchroscope, which for the purposes of description will be assumed to be connected up in the usual manner to indicate the relationship between the system frequency and the standard frequency.

The synchronizing relay T receives its maximum energizing current when the synchroscope needle reaches its synchronizing position, and is set to lift its contacts 50° before that position is reached, these contacts falling 150° after the synchronizing position is passed. The voltage across the auxiliary synchronizing relay U becomes zero 30° after the synchronizing position when the system frequency is less than the standard frequency or 30° before the synchronizing position if the system frequency is greater than the standard frequency. This relay U is set to lift its contacts 120° after its own zero position the contacts falling 35° before the zero position is again reached. Thus with the system frequency too high the auxiliary synchronizing relay U will lift its contacts $U^2$ $U^3$ 90° after the synchronizing position and will drop them again 65° before the synchronizing position, so that the contacts $U^2$ will be down during the period when the synchronizing relay T could be energized. The synchronizing relay T thus remains inoperative so long as the system frequency is too high. On the other hand with the system frequency too low, the auxiliary synchronizing relay U will lift its contacts 150° after the synchronizing position and drop them 5° before the synchronizing position, whilst the synchronizing relay contacts will lift 50° before the synchronizing position and fall 150° after the synchronizing position simultaneously with the lifting of the auxiliary synchronizing relay contacts.

If now the change in load conditions has caused the system frequency to be increased, the auxiliary synchronizing relay contacts $U^3$ will repeatedly rise and fall, but the synchronizing relay T will remain deenergized and will thus prepare the circuit through the lower-speed busbar $O^3$ and such wattmeter relay permissive contacts $P^5$ as are closed to the lower-speed contactors R. This circuit is controlled by the normally closed contacts $U^3$ and $V^1$. If the change in frequency has been large, the synchroscope needle will be rotating too fast for the interrupter relay V to operate its contacts $V^1$, and consequently the energizing current supplied to the lower-speed contactors R and therefore also to the corresponding governor motors $R^2$ will be intermittently interrupted owing to the rise and fall of the auxiliary synchronizing relay contacts $U^3$. Thus the speed of all the machines (except those taking too small a load) is lowered gradually and the system frequency tends to approach the standard frequency. At a predetermined point in the approach to equality of frequencies, the time allowed for the lifting of the interrupter relay contacts $V^1$ becomes sufficient for them to complete their lift before the lifting of the auxiliary synchronizing relay contacts $U^3$, and from then onwards the amount of interruption in the supply of energizing current to the motors $R^2$ is increased, so that the approach to synchronism becomes more gradual. Ultimately the state of synchronism is reestablished and the load-sharing devices complete their operation of uniformly distributing the load.

In the case when the load change acts to decrease the system frequency, both synchronizing relays T U repeatedly operate, but in such a manner that the auxiliary synchronizing relay contacts $U^3$ are never down when the synchronizing relay contacts $T^3$ are down. Thus current is intermittently supplied to the raise-speed busbar $O^4$ and thence through such wattmeter relay permissive contacts $P^6$ as are closed to the raise-speed contactors $R^1$ of the machines. Thus the speed of all the machines M (except those taking too great a load) is increased gradually and ultimately the normal synchronous conditions are reestablished in a manner corresponding to that just described for the opposite frequency change, the interrupter relay V functioning as before at the appropriate moment.

The synchronizing apparatus may also be employed when it is desired to bring an additional machine into circuit to control the synchronizing of such incoming machine, suitable relays and switches being provided to transfer the connections from frequency regulation to synchronizing when required.

In order to guard against improper functioning of the load-sharing apparatus under fault conditions on any of the generators, it is desirable to provide protective arrangements for isolating faulty generators. Any suitable known form of protective gear may be employed for this purpose, but Figure 5 shows by way of example the use of a system with Merz-Price circulating current and fuse time limit overload protection. Thus each machine M is provided on both sides with current transformers W, whose secondaries are connected together and to a tripping relay W¹ in the usual manner, fuses W² being provided in the transformer secondary connections. The contacts W³ of the relay W¹ control the circuit from the D. C. busbars O⁵ O⁶ to the trip coil N⁴ of the circuit-breaker N through an auxiliary switch N³.

It will be appreciated that the above arrangements have been given by way of example only and that modifications may be made within the scope of the invention. The arrangements may also be varied in ways other than those described to suit the type of generating or translating device to which the invention is to be applied. Again the invention may be applied to load-sharing between devices of different types, such for example as rotary converters and mercury arc rectifiers running in parallel or A. C. generators and transformers.

What we claim as our invention and desire to secure by Letters Patent is:—

1. In apparatus for automatically sharing the load between a number of electrical generating or translating devices, the combination of a relay associated with each device, means for energizing each relay differentially in accordance with the load on the associated device and with the average load on all the devices, a controller common to all the devices, and means whereby the regulation of each device is controlled partly by the associated relay and partly by the common controller.

2. In apparatus for automatically sharing the load between a number of electrical generating or translating devices, the combination of a relay associated with each device, means for energizing each relay differentially in accordance with the load on the associated device and with the average load on all the devices, a controller common to all the devices actuated automatically in accordance with the total load on all the devices, and means whereby the regulation of each device is controlled partly by the associated relay and partly by the common controller.

3. In apparatus for automatically sharing the load between a number of electrical generating or translating devices, the combination of a relay associated with each device, means for energizing each relay differentially in accordance with the load on the associated device and with the average load on all the devices, a controller common to all the devices, and contacts on each differential relay which when closed permit the common controller to control the regulation of the associated device.

4. In apparatus for automatically sharing the load between a number of electrical generating or translating devices, the combination of a relay associated with each device, means for energizing each relay differentially in accordance with the load on the associated device and with the average load on all the devices, a controller common to all the devices actuated automatically in accordance with the total load on all the devices, contacts on each relay which when closed permit the common controller to control the regulation of the associated device, and further contacts on each relay which enable the relay to control the regulation of its associated device independently of the common controller.

5. In apparatus for automatically sharing the load between a number of electrical generating or translating devices, the combination of an auxiliary circuit associated with each device, means for energizing each auxiliary circuit in accordance with the load on the associated device, summation busbars so connected to the auxiliary circuits as to be energized in accordance with the average load on all the devices, a relay associated with each device and energized differentially from the associated auxiliary circuit and from the summation busbars, a controller common to all the devices actuated automatically in accordance with the total load on all the devices, and means whereby the regulation of each device is controlled partly by the associated relay and partly by the common controller.

6. In apparatus for automatically sharing the load between a number of electrical generating or translating devices, the combination of an auxiliary circuit associated with each device, means for energizing each auxiliary circuit in accordance with the load on the associated device, summation busbars so connected to the auxiliary circuits as to be energized in accordance with the average load on all the devices, a relay associated with each device and energized differentially from the associated auxiliary circuit and from the summation busbars, a controller common to all the devices, contacts on each relay which when closed permit the common controller to control the regulation of the associated device, and further contacts on each relay which enable the relay to control the regulation of its associated device independently of the common controller.

7. In apparatus for automatically sharing the load between a number of A. C. generators operating in parallel, the combination of a differential relay of the wattmeter type associated with each generator, means for energizing each relay differentially in accordance with the load on the associated generator and with the average load on all the generators, a frequency-responsive contact-making device common to all the generators, and means whereby the speed of each generator is controlled partly by the associated differential relay and partly by the common contact-making device.

8. In apparatus for automatically sharing the load between a number of A. C. generators operating in parallel, the combination of a differential relay of the wattmeter type associated with each generator, means for energizing each relay differentially in accordance with the load on the associated generator and with the average load on all the generators, a frequency-responsive contact-making device common to all the generators, and contacts on each differential relay which when closed permit the common contact-making device to control the speed of the associated generator.

9. In apparatus for automatically sharing the load between a number of A. C. generators operating in parallel, the combination of a current transformer so connected to each generator that its secondary circuit is energized in accordance with the load on the associated generator, summation busbars so connected to the current transformer secondaries as to be energized in accordance with the average load on all the generators, a relay of the wattmeter type associated with each generator and energized differentially from the associated current transformer secondary and from the summation busbars, a frequency-responsive contact-making device common to all the generators, and means whereby the speed of each generator is controlled partly by the associated differential relay and partly by the common contact-making device.

10. In apparatus for automatically sharing the load between a number of A. C. generators operating in parallel, the combination of a current transformer so connected to each generator that its secondary circuit is energized in accordance with the load on the associated generator, summation busbars so connected to the current transformer secondaries as to be energized in accordance with the average load on all the generators, a relay of the wattmeter type associated with each generator and energized differentially from the associated current transformer secondary and from the summation busbars, a frequency-responsive contact-making device common to all the generators, contacts on each differential relay which when closed permit the common contact-making device to control the speed of the associated generator, and further contacts on each relay which enable the relay to control the speed of its associated generator independently of the common contact-making device.

In testimony whereof we have signed our names to this specification.

WILLIAM ANTHONY AMBROSE BURGESS.
NORMAN COOKE.